United States Patent [19]
Reits

[11] Patent Number: 5,862,274
[45] Date of Patent: Jan. 19, 1999

[54] APPARATUS FOR THE ASSESSMENT OF DAMAGE TO A SHIP

[75] Inventor: Bernard Jozef Reits, Hengelo, Netherlands

[73] Assignee: Hollandse Signaalapparaten B.V., Hengelo, Netherlands

[21] Appl. No.: 793,799

[22] PCT Filed: Sep. 7, 1995

[86] PCT No.: PCT/EP90/03541

§ 371 Date: Mar. 17, 1997

§ 102(e) Date: Mar. 17, 1997

[87] PCT Pub. No.: WO96/08706

PCT Pub. Date: Mar. 21, 1996

[30] Foreign Application Priority Data

Sep. 15, 1994 [NL] Netherlands ............... 9401493

[51] Int. Cl.[6] ....................................... G01S 3/78
[52] U.S. Cl. ................................. 385/13; 385/147
[58] Field of Search ....................... 385/12, 13, 45, 385/147

[56] References Cited

U.S. PATENT DOCUMENTS

| | | | |
|---|---|---|---|
| 4,581,527 | 4/1986 | Crane et al. | 250/227 |
| 4,692,610 | 9/1987 | Szuchy | 250/227 |
| 5,015,842 | 5/1991 | Fradenburgh et al. | 250/227.15 |
| 5,136,235 | 8/1992 | Brandle et al. | 324/96 |
| 5,293,039 | 3/1994 | Mongiols | 250/227.16 |
| 5,592,149 | 1/1997 | Alizi | 340/550 |

*Primary Examiner*—John D. Lee
*Assistant Examiner*—Ellen E. Kang
*Attorney, Agent, or Firm*—Oblon, Spivak, McClelland, Maier & Neustadt, P.C.

[57] ABSTRACT

A low cost and rugged apparatus for assessing damage to a ship's hull. Parallel optical fibers run along the ship's hull. If damage occurs, the fibers are broken and the breaks are detected by a centrally located unit. The location and extent of damage can be accurately determined. The fibers can also be used to detect fires and to convey operator induced alarm signals.

15 Claims, 1 Drawing Sheet

APPARATUS FOR THE ASSESSMENT OF DAMAGE TO A SHIP

BACKROUND OF THE INVENTION

The invention relates to an apparatus for the assessment of the damage to a ship, for instance to the ship's hull, comprising a distributed system of optical fibres positioned near the ship's hull, which optical fibres are connected to a central unit designed for determining the transmission or reflection characteristics of the optical fibres, for enabling the assessment of any possible damage.

DISCUSSION OF THE BACKROUND

It stands to reason that the apparatus is required to be extremely rugged and reliable such that also in the event of major damage to the ship, the apparatus will continue to yield reliable information. An advantageous embodiment of the invention is thereto characterised in that the central unit is disposed in an at least substantially central position inside the ship. This position is all the more favourable because the information supplied by the central unit will usually have to be passed on to a command station that also takes up a central position inside the ship.

It will be obvious that damage reporting will be more accurate as the distributed system of optical fibres is more extensive or in fact, as the number of the optical fibres per unit of surface area increases. A favourable compromise in this respect is characterised in that per deck the system of optical fibres comprises at least one optical fibre which at least substantially horizontally stretches along the entire interior perimeter of the ship's hull.

In case of larger ships, the system of optical fibres per deck may comprise at least one optical fibre which at least substantially horizontally stretches along the interior perimeter of the ship's hull via the bow and at least one optical fibre which at least substantially horizontally stretches along the interior perimeter of the ship's hull via the stern. This then entails the additional advantage that damage to the ship's bow and stern can be accurately assessed at the same time.

A vertical application of several substantially parallel optical fibres is also possible, for instance with 1 metre gaps, which enables a more accurate damage assessment in vertical direction.

A further favourable embodiment of the invention is characterised in that for each optical fibre, the central unit comprises an Y splitter at a first end and an Y splitter at a second end, each provided with a light source and detection means. This enables the optical fibre to be operated in transmission and in reflection, which ensures an optimal use. In this embodiment, the detection means connected to the first end are generally arranged for the detection, in transmission, of light emitted by the light source connected to the second end and the detection means connected to the second end are arranged for the detection, in transmission, of light emitted by the light source connected to the first end; furthermore, the detection means connected to an end are arranged for the detection, in reflection, of light emitted by the light source connected to said end.

To prevent mutual interference of the four combined measuring systems thus obtained, an advantageous embodiment is characterised in that the light source connected to the first end and the light source connected to the second end are at least substantially alternately active.

Since one of the objects of the present invention is to use the apparatus for assessing the size of a hole in the ship's hull, the light source will one way or another have to be modulated for thus creating a range resolution at least in reflection. A further favourable embodiment of the invention is thereto characterised in that both light sources alternately emit a light pulse with a length that matches the desired range resolution.

An extremely rugged embodiment of the invention is characterised in that the means for affecting the transmission or reflection characteristics comprise passive means only, which implies that platform infrastructure provisions, such as power supply lines or cooling water pipes etc. are locally not required for measuring a hole in the ship's hull. This is evident as the means is in fact a break in the optical fibre.

According to the invention, additional useful information can be obtained by measuring the temperature at the ship's hull, in which process the modulation can be obtained, as known from the prior art, by the temperature-dependent behaviour of the optical fibre itself. According to the invention, the temperature-dependent Raman scattering is preferably measured and used for determining the local temperature of the optical fibre. The temperature measurement enables the rapid detection of seats of fire. Particularly in the event of damage to the ship's hull, for instance caused by the impact of a missile, it is of utmost relevance to ascertain the presence and locality of a fire.

In case of an emergency, the invention furthermore enables a member of the crew present in a room contiguous to the ship's hull to simply raise the alarm by pressing a button which causes the passing optical fibre to transfer this alarm. A further favourable embodiment of the invention capable of realising this, is characterised in that the modulation means comprise mechanical modulation means for locally increasing, by mechanically distorting the optical fibre, the reflection in the optical fibre. By periodically pressing the alarm button in a predetermined way, it will also be possible to convey coded messages indicating for instance fire, leakage etc.

BRIEF DESCRIPTION OF THE DRAWINGS

The invention will now be explained in greater detail with reference to the following figures, of which.

DISCUSSION OF THE PREFERRED EMBODIMENTS

Figure 1:
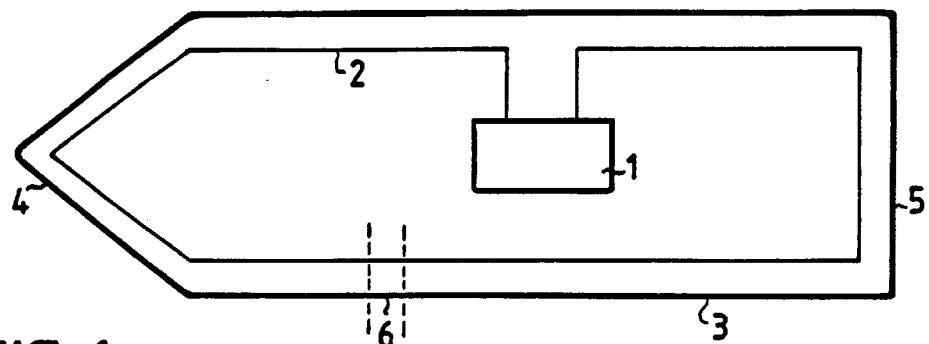
FIG. 1 schematically represents a cross-section of a ship and the course of a optical fibre.
Figure 2:
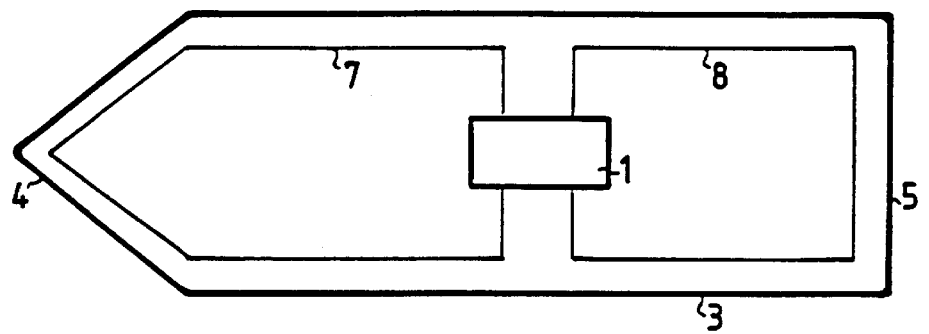
FIG. 2 schematically represents a cross-section of a ship and the course of two optical fibres.

FIG. 1 schematically represents a horizontal cross-section of a ship in which is disposed centrally, in order to reduce vulnerability and to keep the lines of communication with a centrally situated command station short, a central unit 1, from which an optical fibre 2 starts, runs along the ship's hull 3 and returns to central unit 1 via the bow 4 and the stern 5. According to the inventive principle of the invention, central unit 1 can send a light pulse through the optical fibre in both directions and can thus assess, in a manner known in the prior art, the location of a hole 6 in ship's hull 3 by determining the point of time at which the light pulses reflected at the interrupted ends of the optical fibre are received back. By thus running one or more optical fibres 2 around the ship on each deck, it is possible to accurately and instantaneously assess the damage caused to the ship's hull 3 in three dimensions. If desired, the floors of the various decks may also be provided with one or several optical fibres on the basis of which a three-dimensional picture of the damage caused to the entire ship can be obtained. Besides, in case of a large ship where the optical losses in a single optical fibre are considered to be too great, it is possible to split optical fibre 2 up into a first optical fibre 7 running via the bow and a second optical fibre 8 running via the stern, as represented in FIG. 2. An additional advantage is that damage occurring coincidentally to the bow and the stern can be accurately evaluated.

Figure 3:
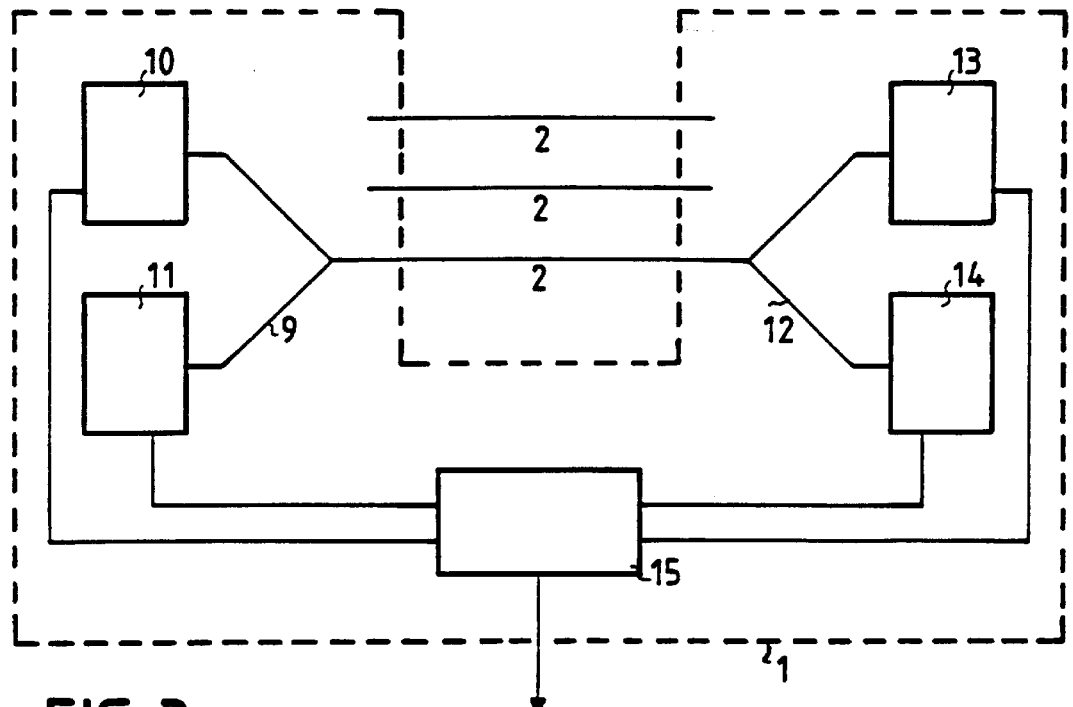
FIG. 3 schematically represents the disposition of the light sources and the detection means.

FIG. 3 represents the method in which an optical fibre according to the invention can be operated. To this end, optical fibre 2 is at a first side provided with an Y splitter 9, well-known in the art, to which a light source 10 and a detector 11 are connected that have been selected such that they can be combined with optical fibre 2. Similarly, optical fibre 2 is at a second side provided with an Y splitter 12, a light source 13 and a detector 14. The Y splitters can be incorporated in central unit 1, which entails the advantage that optical fibres 2 can be connected to central unit 1 using single, low-cost connectors.

The central unit 1 is further provided with a central control unit 15, which generates control pulses for the various light sources and which, in a manner obvious to a person skilled in the art, processes detected signals into data which are suitable for presentation on for instance a display connected to central control 15.

In a first mode of operation, the verification mode, light source 10 for instance delivers a signal to be received by detector 14, which reveals that at least the relevant optical fibre does not sustain any damage. The same can as a matter of course be ascertained by using light source 13 and detector 11 so that the apparatus has a certain measure of redundancy.

In a second mode of operation, the measuring mode, the position of a rupture in optical fibre 2 can be assessed. Light source 10 again produces an optical signal, but the rupture in optical fibre 2 will prevent this optical signal from reaching detector 14. The optical signal will cause a substantial reflection at the position of the rupture, which reflection can be detected by detector 11. By subsequently providing the optical signal produced by light source 10 with a suitable modulation, it is possible to locate the position of the rupture, starting at the first side. Similarly, the rupture can be defined starting from the second side by means of light source 13 and detector 14. This reveals the location and size of the hole, at least in the area determined by the optical fibre. Also in this mode, the apparatus has a certain measure of redundancy, in view of a single rupture in an optical fibre hardly affecting the proper functioning in the second mode of operation.

Suitable modulation types are well-known in the art. In this respect, an obvious modulation type would be an amplitude modulation, the light source, usually a solid-state laser or a LED, emitting a short light pulse, for instance with a duration of 1 ns. However, also optical signals provided with a linear frequency modulation from which the distance to a rupture in the optical fibre can be determined in a manner well-known in the prior art, deserve consideration.

A third mode of operation, the temperature mode, offers the possibility to ascertain, in a manner known in the prior art, the position-dependent temperature of the optical fibre, and consequently of the ship's hull. In this mode, light source 10 for instance emits an optical signal, which will scatter in optical fibre 2 as a function of temperature. This scatter, preferably the Raman scatter well-known in the art, is detected by detector 11, which yields the position-dependent temperature. Detailed information pertaining to this method can for instance be found in "New fiber optic distributed temperature sensor", SPIE Vol. 798 Fiber Optic Sensors II (1987) pp. 131–136. The third mode of operation is of particular relevance since it is suitable for detecting seats of fire in general and those occurring in the proximity of damage incurred in particular.

A fourth mode of operation, the alarm mode, enables crew-members to raise the alarm from a certain room containing an optical fibre. To this end, the room is provided with for instance an alarm button by means of which the optical fibre can locally be sharply distorted, which causes the attenuation of the optical fibre to increase. This also involves an intensity increase of the reflected optical signal. Such a distortion can for instance be realised by using a micro-bend apparatus as for instance known from EP-A 0.240.100. Such a micro-bend apparatus comprises a system of two plates, each of which is provided with a system of mutually complementary ridges between which the optical fibre runs. By moving the plates towards each other, the required distortion of the optical fibre is obtained. Since the location at which the reflection occurs can be determined in said manner, for instance by means of light source 10 and detector 11, the room in which an alarm is generated is known. Since the locations of the alarm buttons are exactly known, they can moreover be advantageously used for the initial calibration of the apparatus.

The optical fibres used may be of the known 50 micron type and are not required to be provided with a protective sheath. Tape is preferably used to glue the optical fibres to an insulating layer usually situated on the interior of the ship's hull. Only that part that runs from the ship's hull to central unit 1, can be provided with a suitable protection.

Although the apparatus has been described with reference to a ship, it will be obvious that it can also find application in an airship or an aircraft.

I claim:

1. An apparatus for damage assessment in a ship's hull, comprising:

an optical damage sensor arrangement positioned proximal to said ship's hull;

a central unit for monitoring changes in reflection of said optical damage sensor arrangement;

optical connecting means, connecting said optical damage sensor arrangement to said central unit, wherein said optical damage sensor arrangement and said optical connecting means each comprise optical fibers and wherein said central unit transmits optical signals into two ends of each of said optical fibers and receives reflections from said optical signals in order to locate holes or tears in said ship's hull and to measure a width of said holes or said tears.

2. Apparatus as claimed in claim 1, characterised in that the central unit is disposed in an at least substantially central position inside the ship.

3. Apparatus as claimed in claim 2, characterised in that per deck the system of optical fibres comprises at least one optical fibre which at least substantially horizontally stretches along the entire interior perimeter of the ship's hull.

4. Apparatus as claimed in claim 3, characterised in that for each optical fibre, the central unit comprises an Y splitter at a first end and an Y splitter at a second end, each provided with a light source and detection means.

5. Apparatus as claimed in claim 4, characterised in that the detection means connected to the first end are arranged for the detection, in transmission, of light emitted by the light source connected to the second end and in that the detection means connected to the second end are arranged for the detection, in transmission, of light emitted by the light source connected to the first end.

6. Apparatus as claimed in claim 5, characterised in that the light source connected to the first end and the light source connected to the second end are at least substantially alternately active.

7. Apparatus as claimed in claim 6, characterised in that both light sources alternately emit a light pulse with a length that matches the desired range resolution.

8. Apparatus as claimed in claim 4, characterised in that the detection means connected to an end are arranged for the detection, in reflection, of light emitted by the light source connected to said end.

9. Apparatus as claimed in claim 8, characterized in that the light source connected to the first end and the light source connected to the second end are at least substantially alternately active.

10. Apparatus as claimed in claim 2, characterised in that per deck the system of optical fibres comprises at least one optical fibre which at least substantially horizontally stretches along the interior perimeter of the ship's hull via the bow and at least one optical fibre which at least substantially horizontally stretches along the ship's hull via the stern.

11. Apparatus as claimed in claim 10, characterized in that for each optical fiber, the central unit comprises an Y splitter at a first end and an Y splitter at a second end, each provided with a light source and detection means.

12. Apparatus as claimed in claim 1 wherein said transmission and reflection characteristics of said optical signals are effected by passive means only.

13. Apparatus according to claim 12, wherein said passive means is a break in at least one of said optical fibers.

14. An apparatus as claimed in claim 12, wherein said passive means is a scattering of light emitted by a light source caused by heating of said optical fiber.

15. An apparatus as claimed in claim 12, wherein said passive means comprises a mechanical distortion of at least one of said optical fibers for locally increasing the reflection in said at least one optical fiber.

\* \* \* \* \*